United States Patent
Kroschel et al.

(10) Patent No.: US 12,383,977 B2
(45) Date of Patent: Aug. 12, 2025

(54) METHOD AND DEVICE FOR OPERATING A LASER MATERIAL PROCESSING MACHINE

(71) Applicant: Robert Bosch GmbH, Stuttgart (DE)

(72) Inventors: Alexander Kroschel, Renningen (DE); Alexander Ilin, Ludwigsburg (DE); Andreas Michalowski, Renningen (DE); Heiko Ridderbusch, Schwieberdingen (DE); Julia Vinogradska, Stuttgart (DE); Petru Tighineanu, Ludwigsburg (DE); Anna Eivazi, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 906 days.

(21) Appl. No.: 17/384,167

(22) Filed: Jul. 23, 2021

(65) Prior Publication Data
US 2022/0032395 A1 Feb. 3, 2022

(30) Foreign Application Priority Data
Jul. 29, 2020 (DE) .......................... 102020209573.6

(51) Int. Cl.
*B23K 26/03* (2006.01)
*B23K 9/095* (2006.01)
*G06N 20/00* (2019.01)

(52) U.S. Cl.
CPC ............ *B23K 26/03* (2013.01); *B23K 9/0953* (2013.01); *G06N 20/00* (2019.01)

(58) Field of Classification Search
CPC .... B23K 26/03; B23K 9/0953; B23K 26/382; B23K 31/006; B23K 31/125; B23K 26/702; G06N 20/00; G06N 7/01; G06N 20/10
See application file for complete search history.

(56) References Cited

U.S. PATENT DOCUMENTS

| | | | |
|---|---|---|---|
| 2009/0083680 A1* | 3/2009 | McConaghy | G06F 30/36 716/103 |
| 2011/0192825 A1* | 8/2011 | Calefati | B23K 31/12 219/121.64 |
| 2017/0032281 A1 | 2/2017 | Hsu | |
| 2018/0336493 A1* | 11/2018 | Hayes | G06N 7/01 |

FOREIGN PATENT DOCUMENTS

| | | |
|---|---|---|
| EP | 3651053 A1 | 5/2020 |
| WO | 2018153866 A1 | 8/2018 |

* cited by examiner

*Primary Examiner* — Robert G Bachner
(74) *Attorney, Agent, or Firm* — NORTON ROSE FULBRIGHT US LLP

(57) ABSTRACT

A computer-implemented method for operating a laser material processing machine. Process parameters are varied with the aid of Bayesian optimization until a result of the manufacturing, in particular the laser material processing, is sufficiently good. The Bayesian optimization is carried out with the aid of a data-based process model in a first phase, the data-based process model being trained as a function of estimated results. In a second phase, the data-based process model is trained as a function of the ascertained result resulting upon activation of the laser material processing machine.

17 Claims, 6 Drawing Sheets

— METHOD AND DEVICE FOR OPERATING A LASER MATERIAL PROCESSING MACHINE

CROSS REFERENCE

The present invention relates to a method for operating a laser material processing machine, a test stand, a computer program, and a machine-readable memory medium.

BACKGROUND INFORMATION

A method for operating a laser material processing machine with the aid of Gaussian process models and Bayesian optimization is described in German Patent Application No. DE 102020205967.5.

Drilling using laser radiation is a manufacturing method for manufacturing drilled holes in greatly varying materials. The laser beam, which is pulsed and focused, for example, is applied to a workpiece. Due to the very high intensity, the absorbed laser energy results in pulsed very rapid heating of the workpiece material, which results, on very short time scales and in a spatially very localized manner, in melt formation and also partial vaporization.

The molten material is expelled from the drilled hole by the process-related explosively generated vapor pressure and also large pressure gradients linked thereto or also by externally supplied gas flows. At particularly high intensities, implemented, for example, by the use of laser radiation involving ultrashort laser pulses, the vaporization proportion is greater and more precise drilled holes may be achieved.

In the case of longer pulse durations and lower intensities, the drilled hole formation is clearly dominated by melt expulsion, which results in reduced precision with significantly higher productivity. In many cases, numerous laser pulses per drilled hole are necessary to manufacture the desired drilled hole. To improve the drilled hole precision, the laser beam may typically be guided on a circular or spiral path at the drilling position by suitable devices.

In the manufacturing method laser drilling, the process development is typically experimental in nature, because the numerous highly dynamic interacting physical effects presently are not able to be modeled with sufficient accuracy. This also includes the fact that the workpiece characteristic data are often unknown for the relevant pressures and temperatures. At most very simplified models are available, using which a certain prediction of the achieved drilled hole shape is possible with given process parameters and in certain parameter ranges. Reliable predictions of quality properties, for example, solidified melt deposits inside the drilled hole or also in the form of a burr at the drilled hole entry, damage to the drilled hole edge, or also the circularity of the drilled holes are presently not possible using these models.

Laser welding is an established manufacturing method for manufacturing connections of workpieces made of different materials. A focused laser beam is applied to the workpieces to be connected. Due to the very high intensity, the absorbed laser energy results in very rapid local heating of the workpiece materials, which results in a shared melt bath formation on short time scales and in a spatially very localized manner. After the solidification of the melt bath, a connection is formed between workpieces in the form of a weld seam.

To meet requirements for the connection strength (and fatigue strength), it may be desirable for the geometry of the weld seam not to fall below a minimum permissible weld seam depth and a minimum permissible weld seam width.

To achieve the desired weld seam shapes, the process parameters may be selected in such a way that rapid and local heating of the materials by the laser radiation results in vaporization in the melt bath. The molten material is expelled from the melt bath by the process-related explosively generated vapor pressure and also large pressure gradients linked thereto or also by externally supplied gas flows. The resulting metallic splashes (so-called weld spatter) may result in a reduction of the component quality and/or may require production interruptions for cleaning the laser welding facility, which causes a significant increase of the manufacturing costs.

As in the case of laser drilling, the process development (process optimization with the goal of minimizing the weld spatter) is also very experimental in nature in the case of laser welding, because the numerous highly dynamic interacting physical effects are not able to be modeled with sufficient accuracy.

One challenge in the modeling in this case is that the workpiece characteristic data are often not known for the relevant pressures and temperatures. The manufacturing tolerances of the individual workpieces and the variations in the materials may also influence the formation of the weld spatter very strongly. Greatly simplified models are in fact available, using which a certain prediction of the achieved weld seam shape is possible with given process parameters and in certain parameter ranges. However, a reliable prediction on quality properties, for example, solidified weld spatter, is not possible using these models.

Because there are many settable process parameters (which are often time-dependent and location-dependent), such as laser power, focus diameter, focus position, welding speed, laser beam inclination, circular path frequency, and process shielding gas, the optimization of the process parameters is a cumbersome process which requires very many experiments. Because, on the one hand, many workpieces or components are required for these experiments and, on the other hand, the evaluation (manufacturing of the cross sections for measuring the weld seam geometry) is also complex, the number of the required experiments has to be reduced to a minimum.

Therefore, for example, some process parameters are set to experience-based values and only relatively few parameters are varied at all. The actually achievable optimum is generally not found.

SUMMARY

It has been recognized that in laser material processing, the achievable precision and productivity are very strongly dependent on the set process parameters, the workpiece material used, and sometimes also its geometry.

The quality criteria of a drilling process are numerous. For example, a size of the drilled hole (for example, a depth-dependent diameter profile), a circularity of the drilled holes, a shape of the drilled hole wall, possible melt deposits, droplet ejection during the drilling process, and a rounding of the drilled hole edges are important. The productivity is typically defined by the number of drilled holes that may be manufactured per unit of time. Moreover, in practice the costs of the required production equipment are also decisive; with increasing flexibility of the variable parameters, the costs normally also rise.

Because there are many settable process parameters (e.g., pulse duration, focus position (time-dependent), focus size, pulse repetition frequency, circular path diameter (time-dependent), circular path frequency, incidence angle (time-dependent), drilling duration, pulse energy (time-dependent), wavelength, process gas type and pressure), which often also may be varied in a time-dependent manner, the optimization of the process parameters is a cumbersome process which requires very many experiments. Because, on the one hand, many workpieces or components are required for these experiments and, on the other hand, the evaluation (in particular of the inner drilled hole shape) is also complex, the number of the required experiments has to be reduced to a minimum.

Therefore, some process parameters may be set to experience-based values and only relatively few parameters are varied at all. The actually achievable optimum therefore generally may only be found with difficulty. Experimental series predefined by experts and/or also methods of statistical experiment planning are possible as planning methods for the experiments.

Because there are many settable process parameters (which are often dependent on time and location), such as laser power, focus diameter, focus position, welding speed, laser beam inclination, circular path frequency, and process shielding gas, the optimization of the process parameters is also a cumbersome process which requires very many experiments in the case of laser welding. Because, on the one hand, many workpieces or components are required for these experiments and, on the other hand, the evaluation (manufacturing of cross sections for measuring the weld seam geometry) is also complex, it is desirable for the number of the required experiments to be reduced to a minimum.

An example embodiment of the present invention may have an advantage over the related art that process parameters of laser material processing machines, which ensure a high quality of the laser material processing, may be found using only few experiments.

Further aspects of the present invention are disclosed herein. Advantageous refinements of the present invention are disclosed herein.

The present invention relates to the way of being able to carry out efficient and targeted optimization of the process parameters. In accordance with an example embodiment of the present invention, the method of Bayesian optimization is used for this purpose. With the aid of this method, optima may be found in functions for which no analytic description is known. An optimum is characterized by target values $q_{i,Target}$ for one or multiple quality properties $q_i$, which are specified by a user. Multiple quality properties may be offset in a so-called cost function K to obtain a single function to be optimized. This cost function also has to be specified by the user. One example is the sum of scaled deviations with respect to the particular target value:

$$K = \sum_{i=1}^{N} s_i |q_i - q_{i,Target}| \tag{1}$$

Parameters $s_i$ are predefinable scaling parameters here. To find the optimum of the cost function, parameter sets for the next experiment may be proposed by the application of the Bayesian optimization. After the experiment is carried out, the resulting values of the quality criteria and thus the present cost function value may be determined and provided as a data point to the optimization method jointly with the set of process parameters.

The Bayesian optimization method is capable, for a function which maps a multidimensional input parameter space on scalar output values, of finding that input parameter set which results in the optimum starting value. If this multidimensional input parameter space is a compact space viewed mathematically, i.e., is bounded in particular in each direction by an upper and a lower barrier, finding the optimum starting value is even guaranteed. Depending on the optimization goal, the optimum is defined here as the greatest possible or alternatively also minimum achievable value which the function values may assume. In terms of process optimization, for example, the input parameter set is given by a specific set of process parameters; the starting value associated with it may be ascertained by the above-described cost function.

Because experiments have to be carried out and evaluated to determine the function values of the cost function, basically only a value table having data, which also have experimental "noise," is available from the function. Because the experiments are very complex, this noise normally may not be suppressed by numerous repetitions with the same input parameter set using subsequent averaging of the results. Therefore, in accordance with an example embodiment of the present invention, it is advantageous to carry out the optimization using a method which also enables global optimization with good results in spite of few experimental evaluations and manages without calculating gradients of the cost function. It has been recognized that Bayesian optimization meets these characteristics.

Bayesian optimization is the mathematical method of the Gaussian processes, using which a continuous function is created based on a given value table, which results in a prediction of the most probable function value including its statistical variance for each input parameter set, and an algorithmically formulated rule for which input parameter set a further functional evaluation (in this case thus an experiment) is to be carried out which is based on the prediction of the Gaussian process.

Specifically, the prediction for the result of the function evaluation in the case of an input parameter set $x_{N+1}$ is given by the most probable value ("mean value") of the Gaussian process $$m(x_{N+1}) = k^T C_N^{-1} t \tag{2}$$

including the variance $$\sigma^2(x_{N+1}) = c - k^T C_N^{-1} k \tag{3}$$

Here, $C_N$ means the covariance matrix, which is given by $$C(x_n, x_m) = k(x_n, x_m) + \beta \delta_{nm} \tag{4}$$

$x_n$ or $x_m$ being parameters in the case of which a function evaluation has already taken place. Variable $\beta$ represents the variance of the normal distribution, which stands for the reproducibility of experiments with identical input parameter, $\delta_{nm}$ is the Kronecker symbol. Scalar c is conventionally given by $c = k(x_{N+1}, x_{N+1}) + \beta^{-1}$.

Vector t contains the particular results for individual parameter sets $x_i$ at which a function evaluation has taken place. Vector k contains the values of the kernel function, which codes the information to what extent the result of the function evaluation in the case of a parameter set $x_n$ still has an influence on the result of the function evaluation in the case of a parameter set $x_m$. Large values stand for a high level of influence, if the value is zero, there is no longer influence.

For the prediction of the mean value and the variance in the above formula, k is calculated for this purpose from all input parameter sets $x_i$ (i=1 ... N) and parameter set $x_{N+1}$ to be predicted. For the kernel function to be used in the specific case, there are different approaches: the following exponential kernel represents a very simple approach:

$$k(x_n, x_m) = \Theta_0 \exp(-\Theta_1 \|x_n - x_m\|), \tag{5}$$

including selectable hyperparameters $\Theta_0$ and $\Theta_1$. In this kernel, $\Theta_1$ is decisive for the influence of the "distance" between the function values in the case of input parameters $x_n$ and $x_m$, because the function goes to zero for large values of $\theta_1$. Other kernel functions are possible.

The selection of the next parameter set at which an experiment is to be carried out is based on the predictions of mean values and variance calculated using the above formulas. Different strategies are possible here; for example, that of "expected improvement."

In this case, that input parameter set is selected for the next experiment in which the expected value for finding a function value is greater (or less, depending on the optimization goal) than in greatest known functional value $f_n^*$ in previous N iteration, thus $$x_{N+1} = \mathrm{argmax}\, E_N[[f(x) - f_N^*]^+] \quad (7)$$

Such a function to be optimized is also referred to as an acquisition function. Other acquisition functions are possible, for example a knowledge gradient or an entropy search.

The "+" operator means here that only positive values are used and negative values are set to zero. In the Bayesian optimization,
 a new experimental point (thus input parameter set) is now determined iteratively,
 an experiment is carried out,
 the Gaussian process is updated using the new function value,
until the optimization is aborted.

The optimization of the Gaussian process using the new experimental point and the new function value is carried out by training of the GP, thus, for example, in such a way that the new pair made up of experimental point and function value is added to the already recorded experimental data made up of pairs of experimental points and function values, and the hyperparameters are adapted in such a way that a probability (for example, a likelihood) of the experimental data is maximized.

This process is illustrated in conjunction with FIG. 4.

A process model (depicted by the Gaussian process) may be built up successively by the iterative procedure of the above-described steps (carrying out an experiment, evaluating the quality criteria and determining the cost function value, updating the Gaussian process, and proposing the next parameter set). The best parameter set of all evaluated function evaluations or experiments is used as the best optimization result.

Advantages are obtained when carrying out the optimization by incorporating existing process knowledge. Knowledge in the form of one or multiple process models $P_{1\ldots n}$ may be incorporated into the optimization, in that real experiments are complemented with simulation experiments. It is unimportant with which uncertainty the models depict the process and how many of the quality criteria they describe.

Any real experiment could be replaced by a simulation experiment using a process model which would perfectly depict the real experiment. If the evaluation duration were less than the real performance, time would also be saved in addition to the effort. In general, however, the prediction accuracy of the process models is limited. Instead, they are only valid in a section of the parameter space, only describe a subset of the process results, or do not take into consideration all physical effects and therefore generate results only within an uncertainty band. In general, process models therefore may not replace physical experiments completely, but only partially.

To integrate these simulation results, it is possible that Gaussian process model GP includes a first Gaussian process $GP_0$, which is trained as illustrated in FIG. 6 with the aid of the results ascertained by simulation, and includes a second Gaussian process $GP_1$, which is trained with the aid of the experimental results. Initially, first Gaussian process $GP_0$ is trained with the aid of the simulation results and the associated process parameters.

Second Gaussian process $GP_1$ is then trained with the aid of actual experimental results $y_{exp}$ and associated process parameters $x_{exp}$, in fact, in that actual results $y_{exp}$ are ascertained by the difference of actual results $y_{exp}$ and the prediction of first Gaussian process $GP_0(x_{exp})$ at associated process parameters $x_{exp}$, thus $$y_{exp} \rightarrow y_{exp} - GP_0(x_{exp}) = y_{exp}^*.$$

In a first aspect, the present invention therefore relates to a method for operating a laser material processing machine 1, 2. In accordance with an example embodiment of the present invention, process parameters x, which characterize an operating mode of laser material processing machine 1, 2, are varied with the aid of Bayesian optimization until a result y of the laser material processing is sufficiently good, the Bayesian optimization taking place with the aid of a data-based process model GP, and in a first phase A, data-based process model GP being trained as a function of estimated results $y_{sim}$, and in a second phase B, data-based process model GP being trained as a function of ascertained result $y_{exp}$ resulting upon activation of laser material processing machine 1, 2.

In this way, it is possible in a particularly simple manner to keep the number of the required experiments low and at the same time to compensate for a possible systematic error of the simulations to be carried out rapidly relative to the experiments.

This may be carried out in that a value of a cost function is ascertained as a function of result y, thus as a function of variables which characterize result y, and it is then ascertained whether this value of the cost function falls below a predefinable threshold value. Variables which characterize the result of the laser material processing may characterize the product generated using the laser material processing, and/or the process of generating.

The value of the cost function may be ascertained here as a function of how much the estimated or actual variables of setpoint variables which characterize a setpoint result of the laser material processing deviate.

An optimum may be ascertained quickly by the Bayesian optimization without having to ascertain gradients, which would not only require numerous actual steps of laser material processing but could also only be ascertained unreliably via difference quotients due to the unavoidable experimental noise. To make this noise sufficiently low, very many experiments would be necessary, which may be saved by the use of Bayesian optimization. In addition, Bayesian optimization optimizes globally, while a gradient descent method only finds a local optimum.

In this way, it is possible in a particularly simple manner to select the variations of the process parameters as accurately as possible and to enable automatic setting of the process parameters in a particularly short time.

It is possible here that data-based process model GP to be trained is given as the sum of a first regression model $GP_0$ and a second regression model $GP_1$, in first phase A, first regression model $GP_0$ being trained and in second phase B, second regression model $GP_1$ being trained.

In particular, possible inadequacies of the simulation model may be compensated for in a particularly simple manner.

This may advantageously take place in that experimentally trained regression model $GP_1$ is trained with the aid of a difference between actual results $y_{exp}$ and a value of regression model $GP_0$ trained by simulation at which process parameter $x_{exp}$ associated with actual result $y_{exp}$ is trained.

It is hereby possible to train experimentally trained regression model $GP_1$ in a particularly simple manner on the error of regression model $GP_0$ trained by simulation. This is particularly advantageous since in this way the complex experiments may be restricted particularly well to those ranges in which relevant deviations of the simulation model exist.

It is particularly advantageous if experimentally trained second regression model $GP_1$ is a Gaussian process model, since this has the mathematical property that mean value m predicted by it tends, in a range outside most extreme experimentally evaluated process parameter $x_{exp}$, toward a predefinable a priori function of the mean value of the Gaussian process model ("mean prior"). The behavior of the second regression model may be checked in a particularly simple manner in this way.

Furthermore, it has been shown that because an extrapolation of the actual result is modeled by a probability, a particularly simple incorporation may take place in that in an acquisition function optimized for the variation of the process parameter, a probability is taken into consideration which characterizes how probable it is that the actual result is within predefinable limits.

It is particularly efficient if probability p(x) is ascertained on the basis of a data-based quality model $GP_D$, in particular a Gaussian process model, since this may be taught within the cycle of the Bayesian optimization and may thus be adapted particularly flexibly to the always specific conditions of the laser material processing. The method is thus particularly robust.

This is particularly efficient if data-based model D is designed to output parameters $m, \sigma^2$ which characterize a statistical prognosis of actual result $y_{exp}$ to be expected.

This is because the mentioned probability may be ascertained directly from the statistical prediction, for example, by numeric integration.

In a further aspect, an example embodiment of the present invention may be generalized to maintaining further boundary conditions if it is taken into consideration in the variation of process parameters x how probable it is that further variables $\varepsilon, \mathcal{F}$, which each characterize further qualities of result y, are within particular predefinable limits $\mathcal{D}_0-\delta, \mathcal{D}_0+\delta, \varepsilon_0-\epsilon, \varepsilon_0+\epsilon, \mathcal{F}_0-\phi, \mathcal{F}_0+\phi$, and the particular probabilities are ascertained using a particular further data-based quality model $GP_\varepsilon, GP_\mathcal{D}$.

The described options for training the data-based process model may be transferred in a corresponding manner with the same advantages to one or multiple of the data-based quality models.

It is advantageously provided here in the cycle of the Bayesian optimization that one, some, or all of the data-based models are trained as a function of the values actually resulting upon the activation of the laser material processing machine, i.e., that data-based process model GP and/or data-based quality model $GP_\mathcal{D}$ and/or one or multiple of particular further data-based quality models $GP_\varepsilon, GP_\mathcal{D}$ are trained as a function of the ascertained result y resulting upon activation of the laser material processing machine and/or the ascertained variable $\mathcal{D}$ resulting upon activation of the laser material processing machine and/or further variables $\varepsilon, \mathcal{F}$ ascertained upon activation of the laser material processing machine. This effectuates a rapid convergence of the Bayesian optimization method and thus rapid finding of optimum process parameters.

It may advantageously be provided that data-based model GP and/or data-based quality model $GP_\mathcal{D}$ and/or one or multiple of particular further data-based quality models $GP_\varepsilon, GP_\mathcal{D}$ are also trained as a function of an estimated result $y_{sim}$ ascertained by simulation.

For example, it may be provided that the estimated result is ascertained with the aid of a physical model of the laser material processing. It is possible by incorporating simulated results to significantly reduce the number of the required laser material processing steps.

This reduction of the required experiments is particularly effective if in a first phase A, data-based model GP and/or data-based quality model $GP_\mathcal{D}$ and/or one or multiple of particular further data-based quality models $GP_\varepsilon, GP_\mathcal{D}$ are trained as a function of estimated results $y_{sim}$ (thus not as a function of the results of an actual activation of the laser material processing machine), and in a second phase B, data-based model $\mathcal{D}$ and/or data-based quality model $GP_\mathcal{D}$ and/or one or multiple of particular further data-based quality models $GP_\varepsilon, GP_\mathcal{D}$ are trained as a function of the ascertained result y resulting upon activation of laser material processing machine 1, 2 and/or ascertained variable $\mathcal{D}$ resulting upon activation of laser material processing machine 1, 2 and/or further variables $\varepsilon, \mathcal{F}$ resulting upon activation of laser material processing machine 1, 2.

In this way, it is possible in a particularly simple manner to keep the number of the required experiments low and at the same time to compensate for a possible systematic error of the simulations to be carried out rapidly relative to the experiments.

The mentioned methods thus enable setting of process parameters x, following the setting of process parameters x, the laser material processing machine being able to be operated using process parameters x set in this way.

Specific embodiments of the present invention are explained in greater detail hereinafter with reference to the figures.

DETAILED DESCRIPTION OF EXAMPLE EMBODIMENTS

Figure 1:
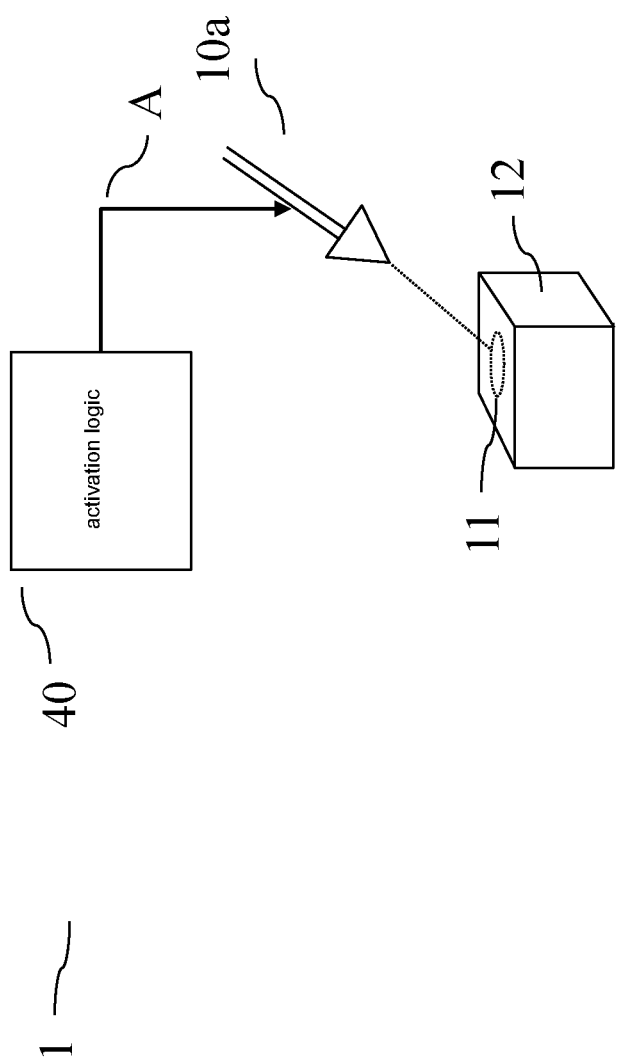
FIG. 1 schematically shows a structure of a laser drilling machine, in accordance with an example embodiment of the present invention.

FIG. 1 schematically shows a structure of a laser drilling machine 1. An activation signal A is provided by an activation logic 40 to activate a laser 10a. The laser beam strikes a material piece 12, where it generates a drilled hole 11.

Figure 2:
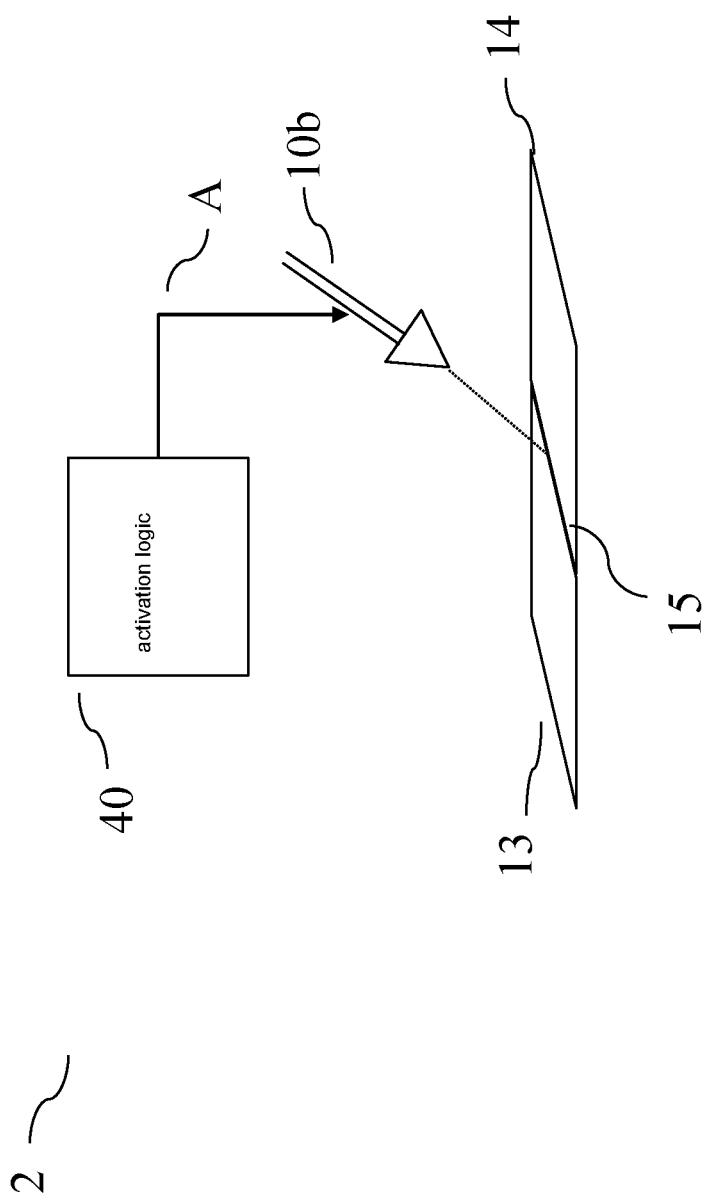
FIG. 2 schematically shows a structure of a laser welding machine, in accordance with an example embodiment of the present invention.

FIG. 2 schematically shows a structure of a laser welding machine 2. An activation signal A is also provided here by an activation logic 40 to activate a laser 10b. The laser beam strikes two material pieces 13, 14 and generates a weld seam 15 there.

A laser cutting machine (not shown) is also similarly possible.

Figure 3:
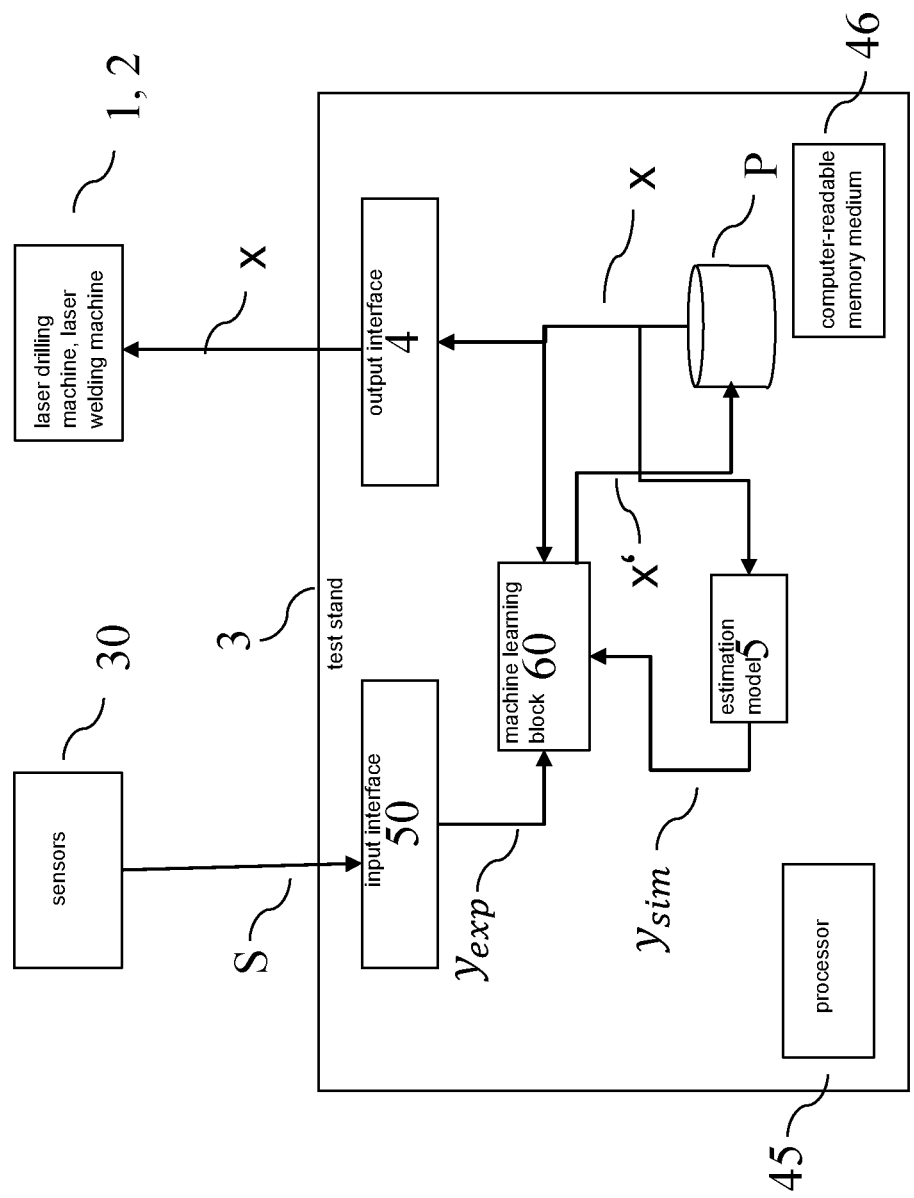
FIG. 3 schematically shows a structure of a test stand, in accordance with an example embodiment of the present invention.

FIG. 3 schematically shows a structure of a test stand 3 for ascertaining optimum process parameters x. Present process parameters x are provided by a parameter memory P via an output interface 4 of the laser material processing machine, for example, laser drilling machine 1 or laser welding machine 2. This machine carries out the laser material processing as a function of these provided process parameters ϕ. Sensors 30 ascertain sensor variables S, which characterize the result of the laser material processing. These sensor variables S are provided as quality properties $y_{exp}$ to a machine learning block 60 via an input interface 50.

Figure 4:
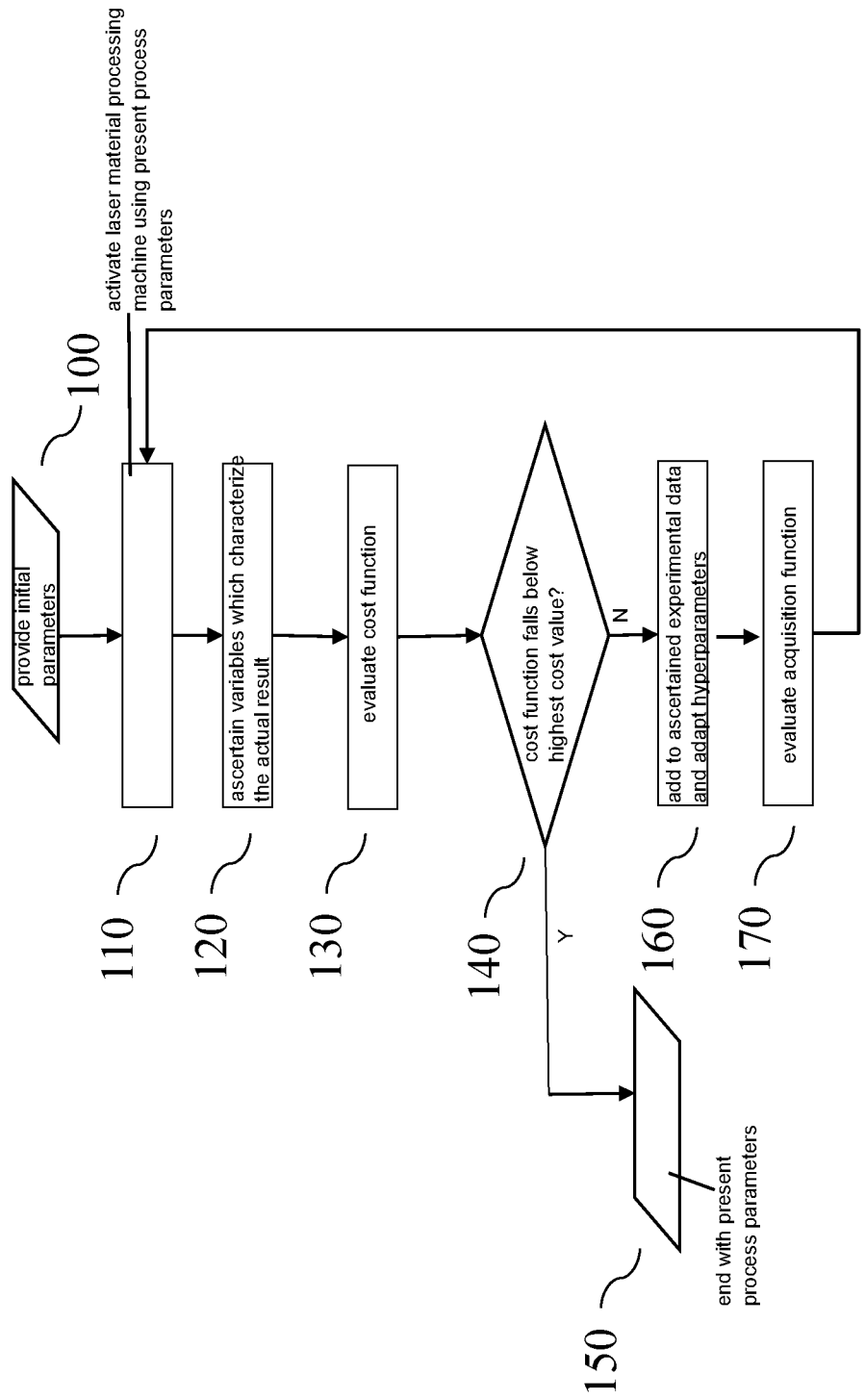
FIG. 4 shows a specific embodiment for operating the test stand in a flowchart, in accordance with the present invention.
Figure 5:
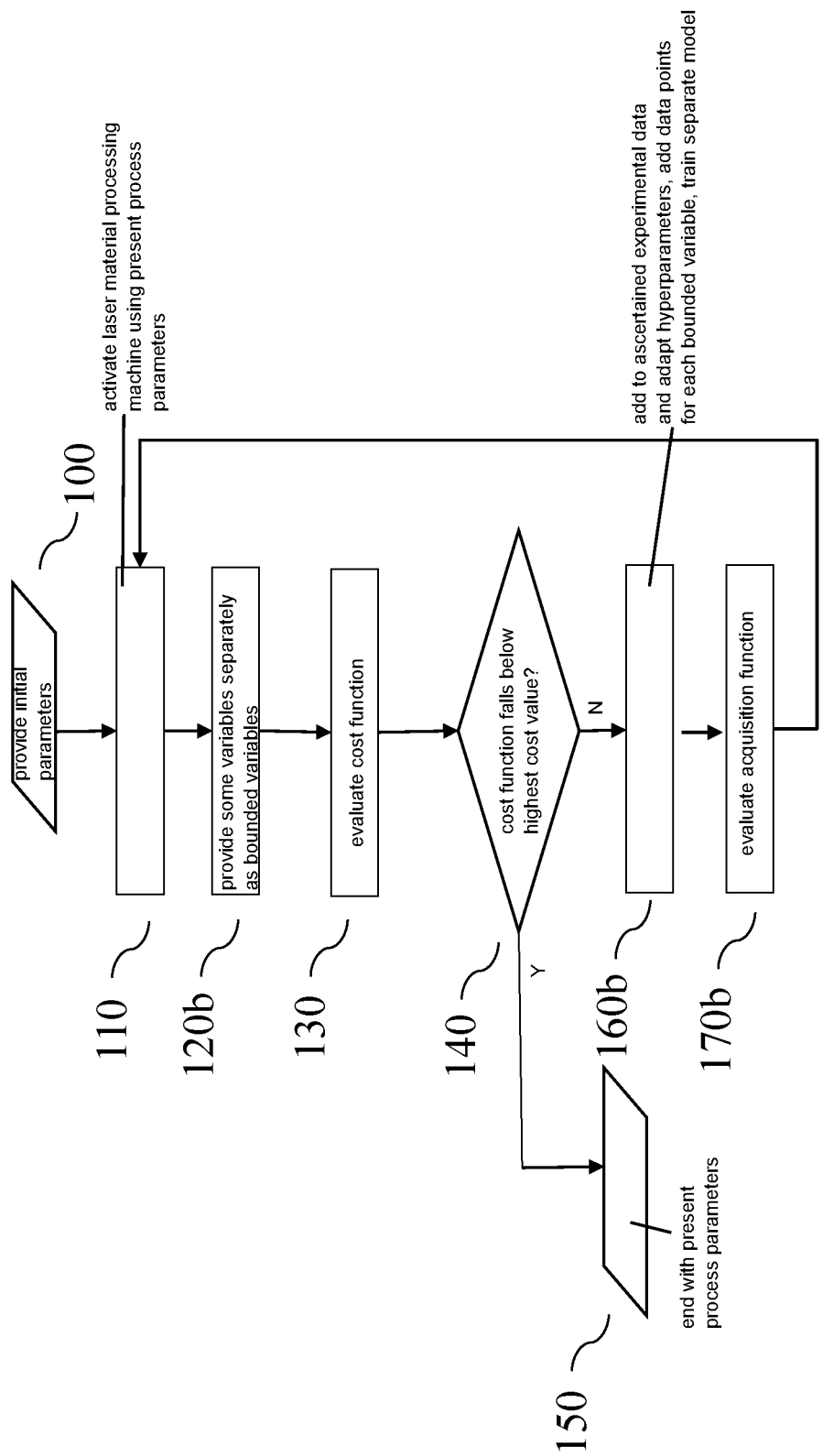
FIG. 5 shows a specific embodiment for operating the test stand in a flowchart, in accordance with the present invention.

In the exemplary embodiment, machine learning block 60 includes a Gaussian process model, which is trained as a function of provided quality properties $y_{exp}$, as illustrated in FIG. 4 and FIG. 5. Varied process parameters x' may be provided as a function of the Gaussian process model, which are stored in parameter memory P.

Process parameters x may also, alternatively or additionally to the provision via output interface 4, be provided to an estimation model 5, which provides estimated quality properties $y_{sim}$ to machine learning block 60 instead of actual quality properties $y_{exp}$.

In the exemplary embodiment, the test stand includes a processor 45 which is configured to execute a computer program stored on a computer-readable memory medium 46. This computer program includes instructions which prompt processor 45 to carry out the method illustrated in FIGS. 4 and 5 when the computer program is executed. This computer program may be implemented in software or in hardware or in a mixed form of hardware and software.

FIG. 4 shows a flowchart of an exemplary method for operating test stand 3. Method begins 100 in that initial process parameters $x_{init}$ are provided as process parameters x and experimental data recorded up to this point are initialized as an empty set. Optionally, process parameters x are predefined using a design of experiment method and as explained in more detail hereinafter, laser material processing machine 1, 2 is activated using these process parameters x, variables $y_{exp}$ are ascertained, and Gaussian process model GP is trained using the experimental data thus ascertained.

In the case of laser drilling, these process parameters x include in one exemplary embodiment a pulse duration, a focus position resolved in a time-dependent manner via a characteristic map and/or a focus size and/or a pulse repetition frequency and/or a circular path diameter (time-dependent) resolved in a time-dependent manner via a characteristic map and/or a circular path frequency and/or an incidence angle resolved in a time-dependent manner via a characteristic map and/or a drilling duration and/or a pulse energy resolved in a time-dependent manner via a characteristic map and/or a wavelength and/or parameters which characterize a process shielding gas, for example, a process gas type or a process gas pressure. The mentioned circular path is a conventional feature here in many drilling methods, for example, in spiral drilling or in trepanning drilling.

In the case of laser welding, these process parameters x include laser power resolved in a time-dependent and/or location dependent manner via characteristic maps and/or a focus diameter and/or a focus position and/or a welding speed and/or a laser beam inclination and/or a circular path frequency of a laser wobble and/or parameters which characterize a process shielding gas.

Laser material processing machine 1, 2 is activated 110 using present process parameters x and variables $y_{exp}$ are ascertained 120 which characterize the actual result of the laser material processing.

In the case of laser drilling, these variables $y_{exp}$ include, in one exemplary embodiment, variables, which characterize the size of drilled hole 12 and/or the circularity of drilled hole 12 and/or the shape of a wall of drilled hole 12 and/or the presence of melt deposits and/or an amount of droplet ejection during the drilling process and/or a rounding of the edges of drilled hole 12 and/or the productivity.

In the case of laser welding, these variables $y_{exp}$ include, in another exemplary embodiment, variables which characterize, along weld seam 15, a minimum weld seam depth and/or minimum weld seam width and/or the productivity and/or a number of weld spatters; and/or a number of pores; and/or a welding distortion; and/or welding residual stress; and/or welding cracks.

As a function of these variables, a cost function K is evaluated 130, as may be given, for example, by equation 1, variables $y_{exp}$ being provided as quality properties $q_i$ and corresponding target values of these variables a $q_{i,Target}$.

A cost function K is also possible which punishes deviations of the quality properties from the target values, in particular if they exceed a predefinable tolerance distance, and rewards a high productivity. The "punishment" may be implemented, for example, by a high value of cost function K, the "reward" correspondingly by a low value.

It is then ascertained whether cost function K indicates that present process parameters x are sufficiently good; in the case in which a punishment means a high value and a reward means a low value in that it is checked whether cost function K falls below 140 a predefinable highest cost value. If this is the case ("yes"), the method ends 150 with present process parameters x.

If this is not the case ("no"), data point x,$y_{exp}$ thus ascertained made up of process parameters x and associated variables $y_{exp}$ characterizing the result is added 160 to ascertained experimental data and hyperparameters $\Theta_0, \Theta_1$ of Gaussian process model GP are adapted in such a way that a probability that the experimental data result from Gaussian process model GP is maximized.

An acquisition function is then evaluated 170, as illustrated by way of example in formula (7), and new process parameters x' are hereby ascertained. The sequence then branches back to step 110.

FIG. 5 shows a flowchart of a further exemplary method for operating test stand 3. Steps 100, 110, 130, 140, 150 are illustrated identically as in FIG. 4, a separate description is therefore omitted.

In step 120b, which replaces step 120 of the method illustrated in FIG. 4, some of variables $y_{exp}$ determined therein are provided separately in each case as bounded variables $\mathcal{D}, \varepsilon, \mathcal{F}, \ldots$, which are each to be in a bounded interval: $\mathcal{D} \in [\mathcal{D}_0 - \delta, \mathcal{D}_0 + \delta]$, $\varepsilon \in [\varepsilon_0 - \epsilon, \varepsilon_0 + \epsilon]$, $\mathcal{F} \in [\mathcal{F}_0 - \phi, \mathcal{F}_0 + \phi)], \ldots$.

In step 160b, which replaces step 160 of the method illustrated in FIG. 4, in addition to the step described in 160, for each of bounded variables $\mathcal{D}$, $\varepsilon$, $\mathcal{F}$, a data point x,$\mathcal{D}$, x,$\varepsilon$, x,$\mathcal{F}$, ... is added in each case to the particular ascertained experimental data, thus associated with each of bounded variables $\mathcal{D}$, $\varepsilon$, $\mathcal{F}$, and similarly to the training of Gaussian process model GP, for each of bounded variables $\mathcal{D}$, $\varepsilon$, $\mathcal{F}$, a separate Gaussian process model G$P_\mathcal{D}$,G$P_\varepsilon$,G$P_\mathcal{D}$ is trained.

In step 170b, which replaces step 170 of the method illustrated in FIG. 4, in addition to the evaluation described there of the acquisition function. For this purpose, as stated above, a so-called "expected improvement" function may be evaluated and maximized as illustrated in formula 7. Furthermore, a predefinable probability function $p_\mathcal{D}$(x) is provided, which characterizes a probability of whether selected process parameters x result in a satisfactory result in laser material processing machine 1, 2 or not, i.e., whether bounded variables $\mathcal{D}$ will actually be in the associated interval, thus $\mathcal{D} \in [\mathcal{D}_0-\delta, \mathcal{D}_0+\delta]$. For further bounded variables $\varepsilon$, $\mathcal{F}$, ... corresponding probability functions $p_\varepsilon(x)$, $p_\mathcal{F}(x)$ are provided.

In the exemplary embodiment, probability function $p_\mathcal{D}$(x) is ascertained from a variance $\sigma^2$ of Gaussian process model $\mathcal{D}$. For this purpose, lower limit $\mathcal{D}_0-\delta$ and upper limit $\mathcal{D}_0+\delta$ variables ascertained for Gaussian process model D are provided and it is ascertained, for example, using numeric integration how great the probability is that the variables ascertained by $\mathcal{D}$ are between lower limit $\mathcal{D}_0-\delta$ and upper limit $\mathcal{D}_0+\delta$, thus $p_\mathcal{D}(x):= p(\mathcal{D}_0-\delta < \mathcal{D}(x) < \mathcal{D}_0+\delta)$. A similar procedure may be used for probability functions $p_\varepsilon(x)$, $p_\mathcal{F}(x)$. The mentioned acquisition function may additionally be multiplied by the product of ascertained probabilities $p_\mathcal{D}(x) \cdot p_\varepsilon(x) \cdot p_\mathcal{F}(x)$ ... and new process parameters x' may hereby be ascertained. The sequence then branches back to step 110.

Figure 6:
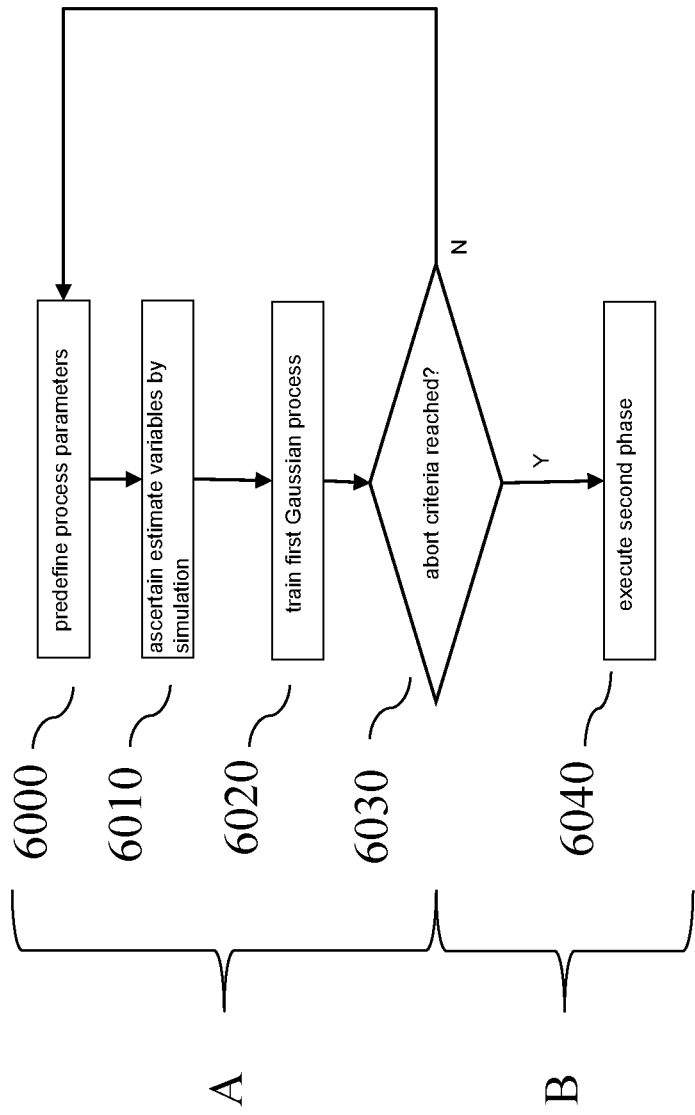
FIG. 6 shows a specific embodiment of a partial aspect of one of the two above-mentioned methods in a flowchart, in accordance with the present invention.

FIG. 6 illustrates in a flowchart the sequence of a method as may be used for training the Gaussian process models GP,G$P_\mathcal{D}$,GP$_\varepsilon$,G$P_\mathcal{D}$. It is illustrated in the following by way of example on the basis of Gaussian process model GP and may be transferred accordingly to each of the others.

The method is made up of first Gaussian process GP$_0$ and second Gaussian process GP$_1$, which together additively result in GP, thus $$GP(x) = GP_0(x) + GP_1(x).$$

The method is made up of a first phase A and a second phase B. The method illustrated in FIG. 4 or in FIG. 5 may be used in each of the phases, estimated variables y$_{sim}$ ascertained by simulation taking the place of actual variables y$_{exp}$ in first phase A.

In first phase A, initially process parameters x are predefined 6000. Estimated variables y$_{sim}$ are then ascertained by simulation 6010.

In the case of laser drilling, for example, this may be carried out as follows with the aid of a physical method: For a radius r of drilled hole 11 along a depth coordinate z, r(z) is numerically ascertained as the solution of the equation $$[1-R(r,z,\alpha,\theta)]\cdot \cos\theta \cdot F_0(r,z) - \tilde{F}_{th} = 0 \tag{8}$$

where $$1 - R = \frac{1}{2} \cdot \left( \frac{4n \cos\theta}{(n^2+k^2)+2n\cos\theta+\cos^2\theta} + \frac{4n\cos\theta}{(n^2+k^2)\cos^2\theta+2n\cos\theta+1} \right) \tag{9}$$

$$F_0(r,z) = \frac{2Q}{\pi w^2(z)} \cdot \exp\left(-\frac{2r^2}{w^2(z)}\right) \tag{10}$$

$$w(z) = \frac{d_{Fok}}{2}\sqrt{1+\left(\frac{z}{l_{Rayleigh}}\right)^2} \tag{11}$$

$$\tan\alpha = \frac{r}{w(z)}\frac{dw(z)}{dz} \tag{12}$$

In this case:
$\bar{n}=n+ik$ is a predefinable complex index of refraction of material piece 12, with index of refraction n and extinction coefficient k $\tilde{F}_{th}$ is a predefinable ablation threshold fluence of material piece 12, Q is a predefinable pulse energy of laser 10a, d$_{Fok}$ is a predefinable focus diameter of laser 10a, l$_{Rayleigh}$ is a predefinable Rayleigh length of laser 10a, R is an ascertained reflectivity of material piece 12, α is an ascertained angle of the local beam propagation direction, θ is a predefinable relative angle between incident laser beam and the surface normal of material piece 12, F$_0$ is an ascertained irradiated fluence of laser 10a, w(z) is an ascertained local beam radius.

The prediction of some quality properties such as a presence of melt deposits and/or an amount of droplet ejection during the drilling process is not possible using this physical model. An empirical model may be predefined, for example, to ascertain these quality properties.

Alternatively or additionally, it is possible that at least some of the quality properties may not be reliably calculated for all process parameters x. It is possible that it is checked whether present process parameters x are within a predefinable range, and if this is not the case, the quality properties are ascertained with the aid of one of the above-mentioned approaches.

In the case of laser welding, the ascertainment of estimated variables y$_{sim}$ may be carried out as follows, for example, using a physical model:

$$T(x,y,z) - T_0 = \frac{1}{2\pi\lambda h}\exp-\frac{v(x-x_0)}{2a}\left(q_{net}K_0\left(\frac{vr}{2a}\right) + 2\sum_{m=1}\cos\frac{m_{pi}z}{h}K_0\left(\frac{vr}{2a}\sqrt{1+\left(\frac{2m_\pi a}{vh}\right)^2}\right)l_m\right) \tag{13}$$

where $$r = \sqrt{(x-x_0)^2+y^2} \tag{14}$$

$$l_m = \int_0^h q_{1net}(z)\cos\frac{m_\pi z}{h}dz \tag{15}$$

and the parameters $T_0$—a predefinable ambient temperature $x_0$—a predefinable offset of laser 10b to the origin of a coordinate system movable with laser 10b $\lambda$—a predefinable thermal conductivity of material pieces 13, 14;

a—a predefinable temperature conductivity of material pieces 13, 14;

$q_{net}$—a predefinable power of laser 10b;

$q_{1net}$—a predefinable power distribution of laser 10b along a depth coordinate of material pieces 13, 14;

v—a predefinable speed of laser 10b;

h—a predefinable thickness of material pieces 13, 14; and Bessel function $$K_0(\omega) = \frac{1}{2} \int_{-\infty}^{\infty} \frac{e^{i\omega t}}{\sqrt{t^2+1}} dt$$

and an ascertained temperature distribution T(x,y,z). A width or a depth of the weld seam may be ascertained from the temperature distribution (for example via the ascertainment of isotherms at a melting temperature of a material of material pieces 13, 14).

First Gaussian process $GP_0$ is then trained 6020 with the aid of estimated results $y_{sim}$.

It is subsequently checked whether an abort criterion is reached 6030. For example, it may be checked whether a cost function K ascertained as a function of estimated result $y_{sim}$ falls below a predefinable threshold value. If the abort criterion is met, second phase B follows; otherwise the sequence branches back to 6000.

In second phase B, the method illustrated in FIG. 4 and FIG. 5 is executed 6040, instead of Gaussian process model GP, second Gaussian process $GP_1$ being trained with the aid of actual results $y_{exp}$ and associated process parameters x, in fact in that actual results $y_{exp}$ are ascertained by the difference of actual results $y_{exp}$ and the prediction of first Gaussian process $GP_0(x)$ at associated process parameters $x_{exp}$, thus $$y_{exp} \rightarrow y_{exp} - GP_0(x) = y_{exp}^* \tag{16}$$

Second Gaussian process $GP_1$ is then trained using actual results $y_{exp}^*$ thus transformed and associated process parameters $x_{exp}$.

Instead of first Gaussian process $GP_0$, another suitable regression model may also be used. For example, it is possible to instead use a suitable polynomial (possibly defined piecewise) or a spline.

What is claimed is:

1. A computer-implemented method for operating a manufacturing machine, the method comprising the following steps:
ascertaining a result by activation of the manufacturing machine;
varying process parameters using Bayesian optimization until the result of a manufacturing with the manufacturing machine satisfies a quality criterion, the Bayesian optimization being carried out using a data-based process model, wherein in a first phase, the data-based process model is trained as a function of estimated results, and in a second phase, the data-based process model is trained as a function of the result; and
operating the manufacturing machine in accordance with the varied process parameters.

2. The method as recited in claim 1, wherein the manufacturing machine is a laser material processing machine, and the manufacturing is laser material processing.

3. The method as recited in claim 1, wherein the data-based process model to be trained corresponds to a sum of a first regression model and a second regression model, and wherein in the first phase, the first regression model is trained, and in the second phase, the second regression model is trained.

4. The method as recited in claim 3, wherein the second regression model is trained with a difference of the result and a prediction of the first regression model in the case of associated process parameters.

5. The method as recited in claim 4, wherein the second regression model is a Gaussian process model.

6. The method as recited in claim 5, wherein the first regression model is also a Gaussian process model.

7. The method as recited in claim 1, wherein it is taken into consideration in the variation of the process parameters how probable it is that a variable, which characterizes a quality of the result is within predefinable limits.

8. The method as recited in claim 7, wherein in an acquisition function, as a function of which the variation of the process parameters is ascertained, a probability is taken into consideration which characterizes how probable it is that the result is within predefinable limits.

9. The method as recited in claim 8, wherein the probability is ascertained based on a data-based quality model.

10. The method as recited in claim 9, wherein the data-based quality model is configured to output parameters which characterize a statistical prognosis of a result to be expected.

11. The method as recited in claim 10, wherein it is taken into consideration in the variation of the process parameters how probable it is that further variables, which each characterize further qualities of the result, are within respective predefinable limits, and the particular probabilities are ascertained using a particular further data-based quality model.

12. The method as recited in claim 7, wherein the data-based process model and/or the data-based quality model is trained as a function of the result resulting upon activation of the laser material processing machine and/or the variable resulting upon activation of the laser material processing machine.

13. The method as recited in claim 9, wherein the data-based quality model is trained as a function of the result and the estimated result.

14. The method as recited in claim 13, wherein in the first phase, the data-based quality model is trained as a function of the estimated results, and in the second phase, the data-based quality model is trained as a function of the result resulting upon activation of the laser material processing machine and/or the variable resulting upon activation of the laser material processing machine.

15. The method as recited in claim 1, wherein following a setting of the process parameters, the laser material processing machine is operated using the process parameters set.

16. A test stand for a laser material processing machine, the test stand configured to operate the laser material processing machine, the test stand configured to:
ascertain a result by activation of the manufacturing machine;
vary process parameters using Bayesian optimization until the result of a laser machine processing with the laser material processing machine satisfies a quality criterion, the Bayesian optimization being carried out using a data-based process model, wherein in a first phase, the data-based process model is trained as a function of estimated results, and in a second phase, the data-based process model is trained as a function of the result; and operate the manufacturing machine in accordance with the varied process parameters.

17. A non-transitory machine-readable memory medium on which is stored a computer program for operating a manufacturing machine, the computer program, when executed by a computer, causing the computer to perform the following steps:

ascertaining a result by activation of the manufacturing machine;

varying process parameters using Bayesian optimization until the result of a manufacturing with the manufacturing machine satisfies a quality criterion, the Bayesian optimization being carried out using a data-based process model, wherein in a first phase, the data-based process model is trained as a function of estimated results, and in a second phase, the data-based process model is trained as a function of the result; and operating the manufacturing machine in accordance with the varied process parameters.

* * * * *